United States Patent [19]

Gupta et al.

[11] Patent Number: 5,717,621

[45] Date of Patent: Feb. 10, 1998

[54] SPEEDUP FOR SOLUTION OF SYSTEMS OF LINEAR EQUATIONS

[75] Inventors: Subhash Gupta, Chicago; Ravi Mehrotra, Palatine, both of Ill.

[73] Assignee: Texas Instruments Incorporated, Dallas, Tex.

[21] Appl. No.: 411,918

[22] Filed: Mar. 28, 1995

Related U.S. Application Data

[63] Continuation of Ser. No. 428,384, Oct. 27, 1989, abandoned.

[51] Int. Cl.$^6$ ................................................ G06F 7/38
[52] U.S. Cl. ................................................ 364/735
[58] Field of Search .............................. 364/735, 736, 364/754

[56] References Cited

U.S. PATENT DOCUMENTS

| | | | |
|---|---|---|---|
| 3,962,573 | 6/1976 | Staley | 364/735 |
| 4,061,906 | 12/1977 | Grebe et al. | 364/735 |
| 4,493,048 | 1/1985 | Kung et al. | 364/754 |
| 4,787,057 | 11/1988 | Hammond | 364/754 |
| 4,807,183 | 2/1989 | Kung et al. | 364/736 X |
| 4,823,294 | 4/1989 | Chang et al. | 364/735 |

FOREIGN PATENT DOCUMENTS

| | | | |
|---|---|---|---|
| 0714409 | 2/1980 | U.S.S.R. | 364/735 |

*Primary Examiner*—Tan V. Mai
*Attorney, Agent, or Firm*—W. Daniel Swayze, Jr.; W. James Brady, III; Richard L. Donaldson

[57] ABSTRACT

An apparatus and method for solving a system of linear equations uses a sequence of matrix-vector multiplications wherein the matrix to be multiplied is derived from an expansion point matrix that permits rapid convergence. The matrix-vector multiplication form of the sequence permits calculations to be performed on a network of parallel processors.

18 Claims, 2 Drawing Sheets

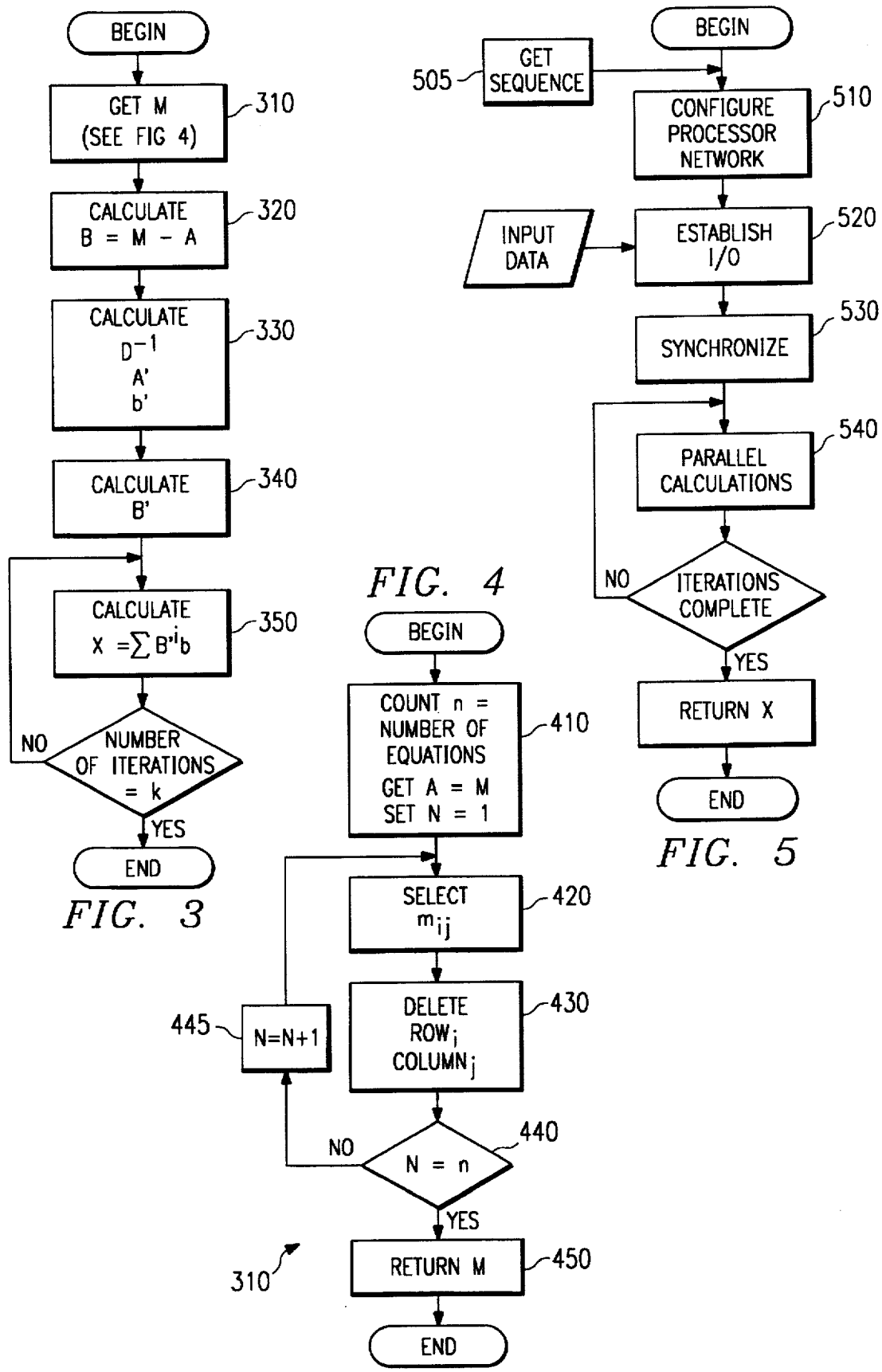

5,717,621

SPEEDUP FOR SOLUTION OF SYSTEMS OF LINEAR EQUATIONS

This application is a Continuation, of application Ser. No. 07/428,384, filed Oct. 27, 1989, now abandoned.

TECHNICAL FIELD OF THE INVENTION

This invention relates in general to solving systems of linear equations, and in particular to increasing the speed with which such solutions can be obtained using a data processing system.

BACKGROUND OF THE INVENTION

Linear equations occur frequently in all branches of science and engineering, and effective methods are need for solving them. Furthermore, many science and engineering problems lead not to a single equation, but to a system of equations. The object of solving the system is to find the values of x that satisfy all n equations simultaneously. Classical methods of solving these systems can be divided into two categories: (1) direct methods and (2) iterative methods.

Direct methods attempt to produce an exact solution by using a finite number of operations. A problem with direct methods, however, is that the number of operations required is large, which makes the methods sensitive to truncation error. Furthermore, direct methods often fail on ill-conditioned matrices.

Iterative methods solve a system of equations by repeated refinements of an initial approximation until the result is acceptably close to the solution. Each iteration is based on the result of the previous one, and in theory, is supposed to improve it. Generally, iterative methods produce an approximate solution of desired accuracy by yielding a sequence of solutions, which converges to the exact solution as the number of iterations tends to infinity.

In solving systems of equations, especially when the number of equations is large, it is desirable to use a computer to take the place of human calculations. Yet, the word length of a computer system has a direct bearing on accuracy, and the likelihood of serious truncation error increases with the number of operations required for a solution. For this reason, iterative methods are often preferred over direct methods because a solution can be arrived at with fewer operations. Yet, existing iterative methods do not adequately minimize the number of operations required to reach a solution.

When solving linear equations with computers, another consideration is hardware efficiency. One way to improve efficiency is to "parallelize" a solution method, which means that multiple operations may be performed simultaneously on a number of processors. Existing iterative methods are not easily parallelizable because they involve matrix power series. The traditional method of parallelization is noniterative, and decomposes A into lower and upper triangular matrices. It is useful only when A has certain characteristics, such as when the decomposition can be done by Gaussian elimination without pivoting.

Another shortcoming of existing parallel methods is that they impose restraints on the size of the hardware with respect to the size of the problem being solved. For a problem of size n, the number of processors, k, required by an algorithm is often expressed as a function of n. Existing methods require the number of processors, k, to be O(n). Furthermore, existing systems require k>=n. If A is n×n and is attempted to be solved on a k×k processor network, where k<n, severe decomposition penalties, extra input/output time, and extra logic are incurred.

SUMMARY OF THE INVENTION

One aspect of the invention is a computer system for solving systems of linear equations. The computer includes a host system having input and output devices, a memory for storing values associated with the problem to be solved, and a host processor. The solution is obtained with at least one processor programmed to perform a sequence of operations, and preferably with a network of processors configured to perform the operations in parallel.

Another aspect of the invention is a processor designed to be used in a network for solving a system of linear equations. The computations permit each processor to be simple and specialized and minimize memory access cycles. The processors are programmed to perform multiply-add calculations and to receive and deliver data as part of a systolic linear network to perform matrix-vector multiplications. The number of processors may be few as n/2, where n is the number of equations.

Another aspect of the invention is a method for minimizing the number of operations required to solve a system of linear equations. A perturbive algorithm generates an infinite series of the form, $$x = \sum_{i=0}^{\infty} B^i b,$$

where B is obtained from a suitably chosen expansion point for rapid convergence.

Another aspect of the invention is a method of using a computer having parallel processors to solve a system of linear equations. The solution to the system is expressed as the sum of a series of matrix-vector multiplications, which may be processed in parallel.

A technical advantage of the invention is that a system of linear equations may be solved with a minimum of operations, thereby reducing error and complexity. A further advantage of the invention is that the solution uses matrix-vector multiplications, which may be performed by processors in parallel. The invention is more General in application than existing parallel methods and is less constraining with regard to the number of processors to be used.

BRIEF DESCRIPTION OF THE DRAWINGS

The novel features believed characteristic of the invention are set forth in the appended claims. The invention itself, however, as well as modes of use, and further advantages, is best be understood by reference to the following detailed description in conjunction with the accompanying drawings.

FIG. 3 is a flowchart illustrating a method of programming a computer to solve a system of linear equations with a minimum number of operations.

FIG. 4 is a flowchart illustrating a method of finding a matrix as required in the method of FIG. 3.

FIG. 5 is a flowchart illustrating a method of using a computer to solve a system of linear equations using parallel processing.

DETAILED DESCRIPTION OF THE INVENTION

The present invention is directed to solving a system of linear equations. In matrix notation, the problem can be expressed as: A x=b, where A is an n×n matrix of coefficients, x is a vector of n unknowns, and b is a vector of n constants. The solution is the unknown n×1 vector, x.

Figure 1:
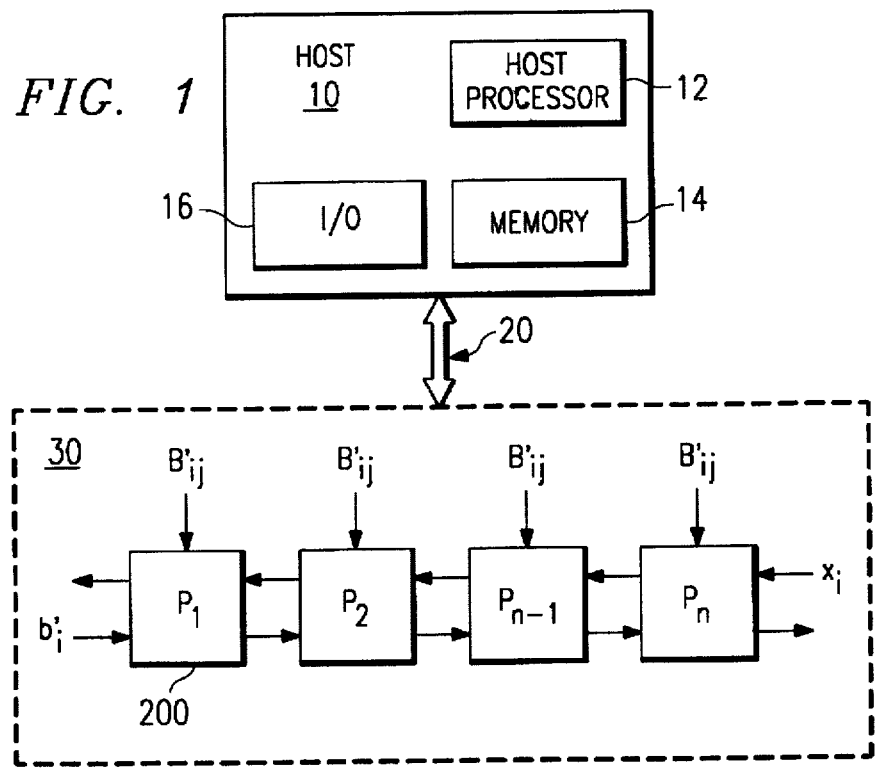
FIG. 1 is a block diagram of a computer system for solving a system of linear equations in accordance with the invention.
Figure 2:
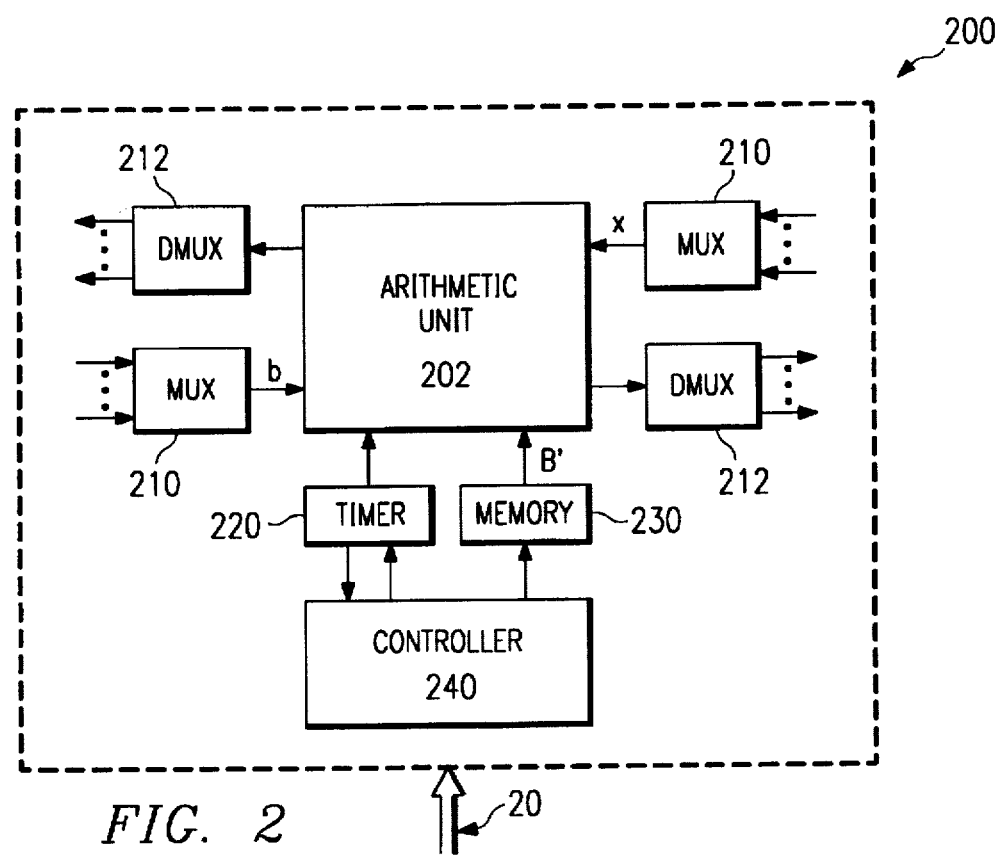
FIG. 2 is a block diagram of a processor, as shown in FIG. 1, for use in a network for solving a system of linear equations in accordance with the invention.

FIGS. 1 and 2, together with the accompanying discussion below, describe apparatuses that embody the invention. FIGS. 3 and 4, together with their accompanying discussion, describe methods. The solution is obtained iteratively, thus for a given positive E, E<=1, the problem may be restated as finding a vector x whose residual has a norm less that E, such that ||Ax−b||<E. This is accomplished by a perturbive algorithm that generates a sequence $\{x_k\}$ that converges to the desired solution. The algorithm permits the solution to be calculated with a minimum of operations and in parallel on a network of processors.

FIG. 1 is a block diagram of the components of the apparatus of the invention. The apparatus has three basic components: host 10, bus 20, and processor network 30.

Host 10 is simply a standard processor-based digital computing device. Host 10 includes a processor 12, programmed to perform certain "global" calculations, as described below in connection with FIG. 3. Host 10 also includes a memory 14, which may be any of a number of well known digital storage devices, and stores data used for the calculations of this inventions, as well as instructions used by processor 12. Host 10 further includes I/O devices 16, such as are associated with any number of well known peripheral devices, including devices whereby data may be input to the system by the user and output from the system for use by the user.

Bus 20 is used to communicate data, address, and timing signals between host 10 and processor network 30. More specifically, as indicated in FIG. 2, each processor is connected to bus 20, such that its controller 240 may receive appropriate data and instructions to carry out the operations described herein.

Referring again to FIG. 1, processor network 30 is comprised of a number of linearly connected processors. In FIG. 1, four such processors are shown, but the number of processors used for a particular solution may vary. As will become evident from the explanation below, the invention could be used with just one processor rather than a network, although in the preferred embodiment the solution of n equations is performed using multiple processors.

The primary requirement of each processor is that it be capable of carrying out instructions in accordance with the algorithms described herein. Although the invention could be implemented with any one of a number of commercially available processors, the advantages of the invention are best realized with the processor of FIG. 2. Thus, FIG. 2 illustrates the preferred embodiment of each processor of network 30. Each processor, $P_i$ designated in FIG. 2 as 200, contains an arithmetic unit 202 that is capable of performing a multiply-add operation.

Each arithmetic unit 202 has two inputs, $x_i$ and $b'_i$, and two outputs $x_{i+1}$ and $b'_{i+1}$. The notations represent values obtained in accordance with the invention, and their derivation is explained below in connection with FIG. 3. Each input is in communication with a multiplexer 210. Each output is in communication with a demultiplexer 212. A control signal is used to select the x and b inputs and outputs of each multiplexer and demultiplexer. As indicated in FIG. 2, other inputs to each arithmetic unit 202 are the appropriate values of B'. This values are stored in a local memory 230 of processor 200.

Timer 220 causes data to move through the processors of network 30 in a regular manner. In accordance with timing signals, each processor 200 performs certain operations on the data it received in response to the previous signal, and then moves the result to the next processor. Thus, the input is "pushed" one variable at a time, rather than being loaded to a memory location. This permits each processor 200 to have a minimum of memory and minimizes communication time.

Another component of each processor 200 is controller 240, which contains a control program. The purpose of controller 240 is to perform the control logic, which results from the programming steps described in connection with FIG. 3. Controller 240 generates control signals that causes operations to be performed by arithmetic unit 202 at appropriate times. Controller 240 includes registers standard to all microprocessors, such as program counter and instruction registers.

Another aspect of the invention is a method of programming processor network 30 to solve a system of linear equations. The method includes the steps of FIG. 3, which may be transformed into instructions useable by a computer by means of computer programming. The method is designed to minimize the number of operations necessary to obtain a solution of a desired accuracy. The method is capable of being performed on a uniprocessor, but an advantage of the invention is that it is easily performed on the network of parallel processors such as are illustrated in FIGS. 1 and 2.

The instructions stored in memory 20 and used by processor network 30 may be in whatever programming language is appropriate for the equipment being used. Eventually, as is the case with existing computer languages, the instructions are reduced to micro-instructions usable by a digital processor.

The general concept of the method of this invention is to express x=(x1, x2 ... xn) as a perturbation infinite series expansion of the form:

$$x = \sum_{i=0}^{\infty} B^i b,$$

which will converge to a solution, such that

||Ax−b||<E.

The development of the series involves the derivation of a matrix, B', and a vector b', which are used in a sequence of matrix-vector multiplications.

In accordance with this general concept, Step 310 is to create a matrix, M, which is n×n, and is easily invertible. In the preferred embodiment, M is invertible by inspection or in O(n) steps. Examples of easily invertible matrices are diagonal matrices and matrices that have exactly one element in each column and row.

Although M may be obtained in a number of ways, in the preferred embodiment, M is obtained by the steps illustrated in FIG. 4, which results in an M that reduces the terms needed to be added to find the desired approximation. Step 420 selects $a_{i'j'}$, such that $|a_{i'j'}|=a_y$ for all i and j. Step 430 deletes the i' row and j' column to obtain a new A. Step 440 is to repeat Steps 420 and 430 until n such elements have been selected. Step 450 arranges the selected values for $a^{ij}$ into a matrix, M, which has n elements and will have only one element per row and one element per column. This procedure can be performed on parallel processors, where a processor 200 receives two inputs, compares them, and passes the larger to its adjacent processor, etc.

Referring again to FIG. 3, after an M has been selected or calculated, Step 320 obtains a matrix B, where:

$$B = M - A. \qquad (a)$$

A, B, and M are n×n matrices. The reason for obtaining this B from M and A is an underlying premise of the invention and may be understood by the following equations (b)–(d). A, B, and M, and their inverses are related as follows:

$$\begin{aligned} A^{-1} &= (M-B)^{-1} \\ &= (I - M^{-1}B)^{-1} M^{-1}. \end{aligned} \qquad (b)$$

The matrix I is the identity matrix. Equation (b) can be expressed as a Taylor series expansion, such that $$A^{-1} = \left[ \sum_{i=0}^{\infty} (M^{-1}B)^i \right] M^{-1}, \qquad (c)$$

which converges when $\|M^{-1}B\| < 1$. Multiplying both sides of (c) by b gives $$\begin{aligned} A^{-1}b &= \left\{ \left[ \sum_{i=0}^{\infty} (M^{-1}B)^i \right] M^{-1} \right\} b \\ &= x. \end{aligned} \qquad (d)$$

Equation (d) is in a form that will converge, and may be performed with a uniprocessor system, but as stated above, an additional feature of the invention is that the solution may be obtained with matrix-vector multiplications, which may be performed on parallel processors.

Thus, to get equation (d) to the desired form, a new matrix, B', referred to as a "multiply matrix" is derived from B. Step 330 obtains values for $C^{-1}$, A', and b' as follows:

$$A' = I - C^{-1}B \qquad (e)$$

such that $\|C^{-1}B\| < 1$. Also, $$A' = \frac{C^{-1}A}{\|C^{-1}b\|} \qquad (f)$$

$$b' = \frac{C^{-1}b}{\|C^{-1}b\|} \qquad (g)$$

From Ax=b and from equations (f) and (g), it follows that:

$$A'x = b' \qquad (h)$$

such that $\|b'\| = 1$.

From these values, Step 340 calculates B' as:

$$B' = C^{-1}B \qquad (i)$$

From the above, it is apparent that B' may be calculated as the product of B and $C^{-1}$, which themselves are derived as shown above. $C^{-1}$ is an "expansion point matrix", which represents an expansion point chosen for rapid convergence.

The multiply matrix, B', may now be used to derive a series. First, by substituting B' into equation (e), $$A' = I - B' \qquad (j)$$

such that $\|B'\| < 1$. From equations (h) and (j), the series is:

$$\begin{aligned} A'^{-1} &= I + B' + B'^2 + \ldots \\ &= \sum_{i=0}^{\infty} B'^i. \end{aligned} \qquad (k)$$

Multiplying both sides of equation (k) by b', the "multiply vector", it follows that:

$$\begin{aligned} A'^{-1}b' &= \sum_{i=0}^{\infty} B'^i b' \\ &= x. \end{aligned} \qquad (l)$$

Equation (1) is a series of matrix-vector multiplications which obtain a solution and depend on values of b', B'b', ..., $B'^k b'$, where k is the number of iterations required for convergence. As explained below, a value for k can be calculated, which avoids the need to constantly evaluate a proposed solution to determine whether it has reached the desired accuracy.

Step 350 is to express the series of equation (1) as a sequence of numerical calculations, which can be calculated on a computer. The goal is to obtain a vector x, whose residual has a norm less than E':

$$\|A'x - b'\| < E'.$$

The sequence $\{x_k\}$ is constructed as follows:

$$x_0 = b'$$

$$x_{i+1} = B'x_i + b',$$

where i=0, 1 ... Thus, $x_k$ depends on b', B'b', ..., $B'^k b'$.

As indicated above, this sequence, or even a sequence derived from equation (d), could be calculated on a uniprocessor system to provide a solution. Yet, an advantage of the invention is that the sequence, a sum of matrix-vector multiplications, is easily parallelizable. Thus, a host processor, such as processor 12 may be used to perform "global" calculations required to generate the sequence. The actual matrix-vector operations may then be carried out on a network of processors 200, such as processor network 30.

As indicated above, the number of iterations required to obtain a solution of desired accuracy can be calculated. From the above equations, it follows that:

$$\|b' - A'x_k\| = \|B'^{k+1} b'\|.$$

Because the norm of B is bounded by a known constant ρ, where ρ<1, then:

$$\|b' - A'x_k\| \leq \rho^{k+1}.$$

For B'b'=ρb', the smallest k for which $\rho^{k+1} < E'$, satisfies the equation:

$$k = \lceil \ln E' / \ln \rho \rceil.$$

This result is used to bound the complexity of finding an E' approximation.

Because equation (1) is a series of matrix-vector multiplications, another aspect of the invention is a method of solving a system of linear equation with parallel processing. These steps are shown in FIG. 5, and use the sequence derived above. In general, the steps of FIG. 5 comprise connecting processors 200 in a network, establishing communication to and from each processor 200, generating timing signals, and using each processor to perform certain matrix-vector calculations.

For purposes of indexing values for use by a computer, matrix-vector multiplications can be expressed as multiplying a matrix $A=(a_{ij})$ with a vector $b=(b_1, b_2 \ldots, b_n)$. The elements in the product, $x=(x_1, x_2, \ldots, x_n)$, can be expressed with the recurrence:

$$x_{i(1)}=0$$

$$x_i^{(k+1)}=x_i^{(k)}+a_{ik}b_k$$

$$x_i=x_i^{(n+1)}.$$

Referring back to FIG. 1, and using the notation of equation (1), the movement of the data through the network of processors 200 is illustrated. The values of $x_i$, which are initially zero, move to the left. The values of $b_{,i}$ move to the right. The values of $B_{,ij}$ move down. All the moves are synchronized as explained below, and each $x_i$ is able to accumulate all its terms before it leaves the network. The computation may be generally described as a systolic computation, analogous to an assembly line. The data moves through the processors 200 in a rhythmic fashion, while operations are performed on them. The processors 200 receive their input from their neighbors, operate on it, and pass it on. This allows each processor 200 to have very little, if any, memory.

Thus, as shown in FIG. 5, Step 510 of this method is arranging a number of processors 200 in a linear network. The end processors 200 receive initial values of x and b'. Each processor 200 is in direct communication with the next, and each processor is responsible for adding the term involving b' to the partial product.

Typically, the number of processors 200 is n/2, although a feature of the invention is that the number of processors can be reduced if certain information is known about the structural characteristics of the matrix the be multiplied. One such structural characteristic is the "sparseness" of the matrix. Generally, when the matrix is dense, the delays between processors are the same. On the other hand, if the matrix is sparse, the delays vary. Timing techniques can exploit this characteristic of sparse matrices. For example, the matrices arising from a set of finite differences or finite elements approximations to differential equations are usually sparse band matrices having nonzero entries in only a few diagonals of the matrix. By introducing proper delays between those processors that have nonzero input, the number of processors 200 required by the systolic array can be reduced to the number of diagonals having nonzero entries. This can be generalized into the strategy that if the matrix to be multiplied is sparse, delays can be used to reduce the number of processors 200.

Step 520 of the method is establishing input and output communications to and from each processor 200 so that appropriate values can be received and delivered in accordance with the above-described process.

Step 530 is generating timing signals. To correctly perform the sequence of equation (1), each data element must be at the right place at the right time. This can be accomplished with the timer 220 and the proper use of delays.

Step 540 of the invention is to perform the numeric calculations necessary to obtain the solution to the sequence. This is accomplished with control instructions, using controller 240. After all matrix values have been fed into the processor network, controller 240 returns the value of x to the host 10 or other means for use by the user.

A further feature of the invention is that it is useful for the more general problem of computing $x=Ab+d$. In this situation, each $x_i$ is initialized as $d_i$. Each $x_i$ accumulates all its terms before it leaves the network.

A still further feature of the invention is that if n is large and requires more processors 200 than a given processor network provides, the matrix can be decomposed into submatrices. By appropriate subcomposition, the size of the submatrices can be made to match the size of the hardware. In other words, the output of the hardware array is fed to the input of the hardware array. Unlike existing parallel methods, it is simple to decompose matrix-vector multiplication on a fixed size linear network without incurring a decomposition penalty.

Although the description herein applies the invention to solving a system of linear equations, the same techniques are applicable for solving problems such as matrix inversion and diagonalization. In other words, the same pipelining method can be used for other iterative algorithms. Any algorithm that depends on the evaluation of $b_1$, Ab $\ldots$ $A^k b$ can be computed as $Az_i$ where $z_i$ is any linear combination of b, Ab, $\ldots A^{i-1}b$.

As a result of the invention, using n/2 processors, the n components of x can be computed in 3n units of time. This is an improvement over the $O(n^2)$ units that were required for the traditional sequential algorithms performed on a uniprocessor. Furthermore, the 3n units of time of the present invention includes input/output time. Accordingly, close to a linear speedup is obtained.

Although the invention has been described with reference to specific embodiments, this description is not meant to be construed in a limiting sense. Various modifications of the disclosed embodiments, as well as alternative embodiments, of the invention will become apparent to persons skilled in the art upon reference to the description of the invention. It is, therefore, contemplated that the appended claims will cover such modifications that fall within the scope of the invention.

What is claimed is:

1. An apparatus for computing a solution to a system of linear equations, comprising:

a host computer having a memory for storing data used by said system and having a processor for performing calculations used to obtain a sequence of matrix-vector operations by deriving a multiply matrix having an expansion point matrix representing an expansion point for rapid convergence of said multiply matrix from said system of linear equations and from an easily invertible matrix;

a timing signal generator for synchronizing the operations of said processor and generating timing signals;

a bus for communicating said data and said timing signals within said host computer;

a processor network, wherein each of said processors in said processor network receives data values representing said multiply matrix, and performs said matrix-vector operations to obtain said solution.

2. The apparatus of claim 1, wherein said network of processors operates in parallel to perform said matrix-vector operations.

3. The apparatus of claim 2, wherein the number of equations is twice the number of processors.

4. The apparatus of claim 2, wherein each of said processors is a multiply-add processor.

5. The apparatus of claim 2, and further comprising a timer associated with each of said processors to cause a systolic movement of said data through said network of processors.

6. A processor apparatus for use in a network of processors for solving a system of linear equations, comprising:

an arithmetic unit for performing multiply-add operations;

a controller unit for generating control signals to cause said arithmetic unit to perform said operations at appropriate times, said controller is programmed to execute a predetermined sequence and to move data values throughout said processor apparatus in a predetermined fashion;

three input connections for receiving data values required for said solution from an adjacent processor;

two output connections for delivering new data values to an adjacent processor after said arithmetic unit performs said multiply-add operation;

wherein said data values are comprised of coefficient values representing coefficients of a matrix derived from said equations, first values representing a constant vector derived from said equations and values representing a solution vector.

7. The apparatus of claim 6, wherein said apparatus further comprises a local memory to store said coefficient values.

8. The apparatus of claim 7, wherein said coefficient values are derived from said linear equations and from an easily invertible matrix.

9. The apparatus of claim 7, wherein said predetermined sequence said controller is programmed to execute requires the multiplication of said coefficient matrix and said solution vector, with the product being added to said constant vector.

10. The apparatus of claim 7, wherein said constant vector values and said solution vector values are delivered to demultiplexers and received from multiplexers.

11. The apparatus of claim 6, wherein said processor operates in parallel with said processors of said network to perform matrix vector operations.

12. A computer-implemented method performed by a computer for solving a system of linear equations, wherein said computer comprises at least a host processor, said system of equations having given values for a coefficient of the system and constant values, comprising the steps of:

receiving said system of linear equations by said host processor, said coefficient and constant values;

assigning of coefficient values of said coefficient by said host processor to a network of processors;

controlling said network of processors to operate in parallel to perform the following steps;

calculating a solution to said linear equations, with said computer, using a sequence derived from a series of partial sums of matrix-vector multiplications, wherein a matrix used for said matrix-vector multiplications is derived from a multiply matrix calculated by said host processor;

repeating said calculations until said solution converges to a desired accuracy; and receiving said solution by said host processor.

13. The computer-implemented method of claim 12, and further comprising the step of establishing inputs to and outputs from each of said processors.

14. The computer-implemented method of claim 12, wherein said method further comprises the step of synchronizing the transfer of said data between said processors and the execution of said calculations.

15. The computer-implemented method of claim 12, wherein said synchronizing step includes the step of transferring said data through said processors in a systolic manner.

16. The computer-implemented method of claim 12, wherein the values used in said sequence are calculated by a host processor.

17. The computer-implemented method of claim 12, wherein said method further comprises the step of using said computer to evaluate characteristics of said coefficient such that the required number of processors are reduced.

18. The computer-implemented method of claim 12, wherein said method further comprises the step of using said computer to decompose said coefficient when the number of unknowns requires more processors than are available in said computer.

* * * * *